(12) United States Patent
Zhao et al.

(10) Patent No.: US 10,890,458 B2
(45) Date of Patent: Jan. 12, 2021

(54) SYSTEM AND METHOD FOR ATTRIBUTING DEVIATION FROM PREDICTED TRAVEL DISTANCE OR TIME FOR ARRANGED TRANSPORT SERVICES

(71) Applicant: Uber Technologies, Inc., San Francisco, CA (US)

(72) Inventors: Dennis Zhao, San Francisco, CA (US); Yueh-Wen Liao, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 320 days.

(21) Appl. No.: 15/943,692

(22) Filed: Apr. 2, 2018

(65) Prior Publication Data

US 2018/0283890 A1 Oct. 4, 2018

Related U.S. Application Data

(60) Provisional application No. 62/480,531, filed on Apr. 2, 2017.

(51) Int. Cl.
*G01C 21/34* (2006.01)
*G06Q 30/02* (2012.01)
*G06Q 50/30* (2012.01)
*G01C 21/36* (2006.01)

(52) U.S. Cl.
CPC ..... *G01C 21/3484* (2013.01); *G01C 21/3697* (2013.01); *G06Q 30/0206* (2013.01); *G06Q 50/30* (2013.01)

(58) Field of Classification Search
CPC ............ G01C 21/3484; G01C 21/3697; G06Q 30/0206; G06Q 50/30
See application file for complete search history.

(56) References Cited

U.S. PATENT DOCUMENTS

| 9,978,282 | B2* | 5/2018 | Lambert | G06Q 50/30 |
| 10,248,913 | B1* | 4/2019 | Gururajan | G06Q 50/30 |
| 2008/0195428 | A1* | 8/2008 | O'Sullivan | G06Q 50/30 705/6 |
| 2008/0270019 | A1* | 10/2008 | Anderson | G06Q 10/06 701/533 |
| 2012/0041675 | A1* | 2/2012 | Juliver | G06Q 30/0283 701/465 |
| 2013/0066688 | A1* | 3/2013 | Pinkus | G07B 15/02 705/7.41 |
| 2013/0246207 | A1* | 9/2013 | Novak | G06Q 30/0641 705/26.2 |
| 2013/0246301 | A1* | 9/2013 | Radhakrishnan | G06Q 30/0282 705/347 |

(Continued)

*Primary Examiner* — Sze-Hon Kong
(74) *Attorney, Agent, or Firm* — Mahamedi IP Law LLP (57) ABSTRACT

A network computer system attributes deviation from a predicted travel distance or trip time for arranged transport services. A network computer system monitors a service provider of an arranged transport service to determine a distance traveled, as well as an expended duration. The network computer system compares the determined distance traveled and/or the expended duration with a predicted distance and/or duration of travel to determine if a deviation exists. An adjustment value for the service value may be determined and communicated, based the traveled distance and the expended duration as compared to the predicted distance and/or duration of travel.

14 Claims, 6 Drawing Sheets

(56) References Cited

U.S. PATENT DOCUMENTS

| | | | |
|---|---|---|---|
| 2014/0038640 A1* | 2/2014 | Wesselius | G08G 1/202 |
| | | | 455/456.1 |
| 2014/0067491 A1* | 3/2014 | James | G06Q 50/30 |
| | | | 705/13 |
| 2015/0012341 A1* | 1/2015 | Amin | G01C 21/3438 |
| | | | 705/13 |
| 2015/0095198 A1* | 4/2015 | Eramian | G06Q 30/0629 |
| | | | 705/26.64 |
| 2015/0179000 A1* | 6/2015 | Jayanthi | G01C 21/26 |
| | | | 701/32.4 |
| 2015/0206267 A1* | 7/2015 | Khanna | G06Q 30/0284 |
| | | | 705/5 |
| 2016/0034828 A1* | 2/2016 | Sarawgi | G06Q 10/02 |
| | | | 705/5 |
| 2016/0069694 A1* | 3/2016 | Tao | H04W 4/44 |
| | | | 701/410 |
| 2016/0078394 A1* | 3/2016 | Fuldner | G06Q 10/063114 |
| | | | 705/7.15 |
| 2016/0171786 A1* | 6/2016 | Otsuka | G06Q 50/30 |
| | | | 705/13 |
| 2016/0247109 A1* | 8/2016 | Scicluna | G06Q 50/30 |
| 2017/0365030 A1* | 12/2017 | Shoham | G06Q 10/02 |
| 2018/0012151 A1* | 1/2018 | Wang | G06Q 10/0639 |
| 2018/0067620 A1* | 3/2018 | Adler | G06Q 10/047 |
| 2018/0322420 A1* | 11/2018 | Marco | G06Q 50/30 |
| 2018/0374182 A1* | 12/2018 | Khanna | G01C 21/3438 |
| 2019/0370922 A1* | 12/2019 | Asghari | G06Q 50/30 |
| 2020/0211142 A1* | 7/2020 | James | G06Q 30/0284 |

\* cited by examiner

SYSTEM AND METHOD FOR ATTRIBUTING DEVIATION FROM PREDICTED TRAVEL DISTANCE OR TIME FOR ARRANGED TRANSPORT SERVICES

RELATED APPLICATIONS

This application claims benefit of priority to Provisional U.S. Patent Application No. 62/480,531, filed Apr. 2, 2017; the aforementioned priority application being hereby incorporated by reference in its entirety.

FIELD

The following disclosure relates to vehicle transport arrangement services, and more specifically to attributing deviation from predicted travel distance or time for arranged transport services.

BACKGROUND

User-centric network services typically sequence users through a number of selection interfaces so that the user can specify certain information for a desired type of service, including service level selections and preferences. Additionally, users may utilize information to make decisions, such as selection of service type or whether service is desirable.

Transport arrangement services exist in various forms. In many locations, transport arrangement services provide upfront commitments to potential users. For example, U.S. patent application Ser. No. 14/942,361, now issued as U.S. Pat. No. 9,939,279, provides for a computer system and method to determine parameters such as a predicted trip completion time for a user, in context of a shared transport request.

DETAILED DESCRIPTION

According to some examples, a network computer system operates with numerous users, operating as customers or providers, in order to determine service parameters from which services can be matched and valued. In some values, a network computer system determines an expected service value for a customer, where the service value is based on expected service parameters that are dynamic or uncertain. The service provider may be monitored to determine when a service is fulfilled. Once the service is fulfilled, the service value is used to allocate account resources (e.g., electronic funds) between the customer and the service provider. If the expected value for the service provided exceeds one or more threshold metrics, the service value may be calculated parameters which are determined after fulfillment of the service request. Attribution of the deviation from the expected service value may also be determined in order to determine an adjustment value to the expected service value.

According to some examples, a computer system determines an expected distance of travel and an expected duration of travel for an inquiry event. An inquiry event may be associated with a set of service parameters that include a service start location and a service completion location. The computer system may determine an expected service value for the inquiry event based at least in part on the expected distance and the expected time of travel. The computer system receives a service request that corresponds to the inquiry event, and the service request may the set of service parameters. After receiving the service request, the computer system may monitor the service provider to determine a traveled distance and an expended duration for the service request to be fulfilled. The computer system may determine at least one of (i) a distance differential of the expected distance and the traveled distance, or (ii) a duration differential of the estimated duration and the expended duration. The computer system may determine an adjustment value for the service value based at least in part on the distance differential and the duration differential.

Examples as described recognize the increasing use of mobile computing devices by users in context of requesting transport services. Examples further recognize the increased use of network computer systems by transport arrangement systems, which utilize communications from mobile computing devices of users (both riders and service providers) to arrange transport services for the users. well as network computer systems by services that arrange transport services for users. Moreover, services that arrange transport can benefit by providing users with an upfront commitment as to the cost (e.g., service value, price) of a requested trip, as the elimination of uncertainty can make prospective riders more willing to request transport service (as compared to an alternative type of transport service, or delaying their request). In the context of arranging transport services, an upfront determination of pricing, for example, can require a network service to predict a distance and time of travel.

Still further, in some examples, a network computer system attributes deviation from a predicted travel distance or trip time for arranged transport services. The network computer system may monitor a service provider of an arranged transport service to determine a distance traveled, as well as an expended duration. The network computer system compares the determined distance traveled and/or the expended duration with a predicted distance and/or duration of travel to determine if a deviation exists. An adjustment value for the service value may be determined and communicated, based the traveled distance and the expended duration as compared to the predicted distance and/or duration of travel.

Examples recognize that for a network service to arrange transport with such upfront commitments, the network service has to account for risk and possible misuse which can otherwise skew the determinations (e.g., predicted distance or time of travel) which underlie the upfront commitments. In order to account for misuse under conventional approaches, a network service may, for example, have to expend computational resources to handle customer complaints, and further exchange communications with service providers and customers in order to retroactively recreate the provided service. With respect to upfront commitments of pricing, the risk of misuse is correlative to a type of inefficiency that can cost a transport arrangement service computational efficiency.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
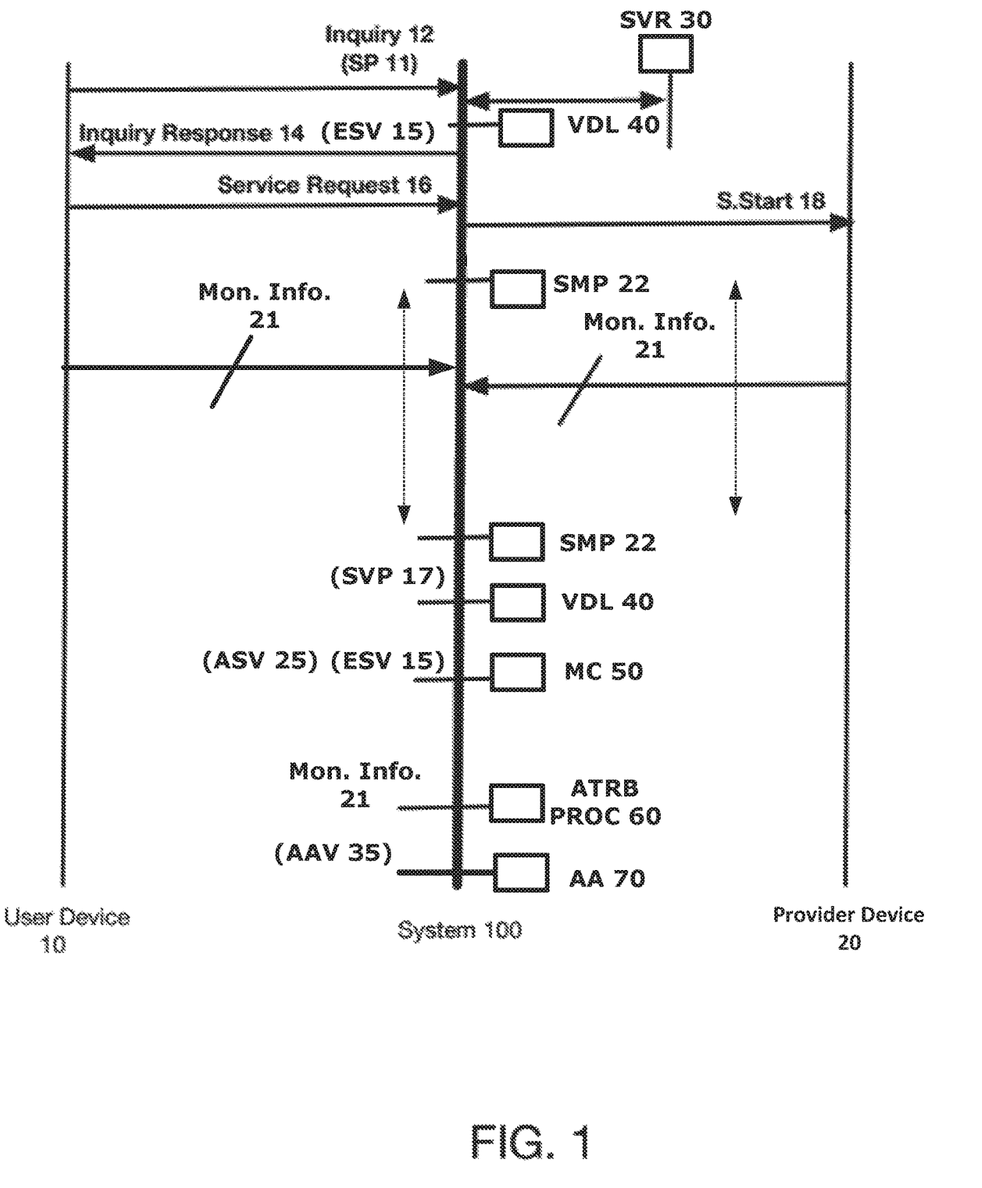
FIG. 1 illustrates a sequence of operations which are implemented on a service arrangement system, according to one or more examples.

FIG. 1 illustrates a sequence of operations which are implemented on a service arrangement system, according to one or more examples. A service arrangement system 100 can be implemented on a network computer system such as described with an example of FIG. 2. For example, the service arrangement system 100 may be implemented on a server, or a combination of servers which communicate over a network with device operated by users and providers. In variations, the service arrangement system 100 may be implemented on a distributed, non-centralized set of computers, such as on devices operated by a user and/or provider.

In some examples the service arrangement system 100 arranges transportation-related services for a population of users. By way of example, the transportation-related services may include transportation of individuals, delivery services (e.g., food delivery, package delivery, grocery delivery), or freight services.

With reference to FIG. 1, the service arrangement system 100 may be implemented to include a server or combination of servers which receive communications from mobile devices operated by users and service providers. In some implementations, the system 100 is implemented as a network platform that includes applications or other functional components which operate on the mobile devices of individual users. For example, a user device 10 operates a customer application which links the customer's mobile device to an account of the customer. Likewise, the provider device 20 operates a provider application which links the service provider's device 20 to an account of the service provider. The system 100 can allocate resources such as funds between accounts of customers and providers.

Still further, with respect to an example of FIG. 1, the system 100 can arrange for a service provider (operating the provider device 20) to transport the user (operating the user device 10). Prior to the user committing to a service request 16, the system 100 is able to communicate an estimated service value 15 for the user (e.g., given a specified destination which the user may be interested in). The commitment to the estimated service value 15 can expedite a user decision to request (or not) transport via system 100. With more expedient user decision making, the system 100 can reduce its own computation efficiency. As illustrated by an example of FIG. 1, once the service request 16 is made, the system 100 implements a sequence of operations that coincide with a desired outcome-specifically, the user is transported to a desired destination and charged a service value that is accurate and reflects the service provided (e.g., distance traveled and/or time expended in completing the user's trip). However, when the service value does not accurately reflect the service provided, the system 100 may implement a resolution process to determine whether the inaccurate estimated service value is attributable to the customer or the service provider. Examples as described implement a resolution process that improves upon, for example, more conventional resolution processes where upfront commitments are made for a provided service. By way of example, system 100 can implement a resolution process as described with an example of FIG. 1 to attribute a deviation from an estimated distance traveled and/or time expended to the service provider and/or customer, or neither. The resolution process implemented by examples of FIG. 1 can eliminate, for example, communications which would otherwise take place between the system 100, the user device 10, and/or the provider device 20.

In an example, each of the user and provider devices 10, 20 execute a corresponding service application which links the respective mobile device with the system 100. On the customer's mobile device, the service application can be operated to initiate an inquiry 12 that specifies a set of service parameters 11, such as a destination or time, or pickup location or time. In an example, the customer may operate the user device 10 to specify service parameters through input on a user-interface provided through execution of a corresponding service application. For example, the customer can specify a pickup or destination by dropping a pin on a map user interface, by selecting the location (e.g., as an address from a list), or by entering an address or other location identifier through a text-interface. In variations, the inquiry 12 can correspond to an action from which an inference of user intent may be made. For example, the inquiry 12 can be initiated when the user launches the corresponding service application, and the service parameters 11 may be determined from the customer's current location, the customer's favorite destination or destination, and/or "hot spots" in the particular geographic region. As an addition or variation, the inquiry 12 may be issued automatically by the service application based on one or more activity triggers, such as (i) a determination (e.g., by the user device 10) that the user's current location is at or near a typical location where the user has previously made service requests for transport; (ii) a contextual determination, based on time of day (and user location), as well as other information sources (e.g., user calendar) that a user will want to request transport in an upcoming time interval; (iii) passage of time after user launches service application; (iv) sensor input (e.g., from an accelerometer of the user device 10) indicating that the user device is being held in a position from which interaction with the service application is likely; and/or (v) a predictive determination that accounts for multiple triggers, such as described above.

Still further, in some variations, the user device 10 can periodically send the inquiry 12 to the system 100. The frequency and/or instance of the inquiry 12 can further be timed to coincide with one or more triggers, such as described above.

The system 100 can handle the inquiry 12 as a noncommittal communication. The system 100 communicates an inquiry response 14 to the user device 10, where an expected service value 15, as well as other information which may be determined from the service parameters 11. In some variations, the system 100 determines the expected service value 15 using value determination logic 40. The value determination logic 40 may employ alternative processes to determine the expected service value 15. In one implementation, the expected service value 15 is calculated based on a time and distance formula, where at least one of time or distance is predicted based on mapping information and/or historical information (e.g., known commute times for the locations of or near the start and destinations specified with the service parameters 11). In variations, the expected service value 15 is determined from a model (e.g., KN model) which uses historical information over a recent time frame (e.g., most recent month) to predict the travel distance, travel time and/or the service value 15. In some variations, the value determination logic 40 may also determines the expected service value 15 based on other considerations, such as route-specific factors (e.g., presence of a toll on a likely route), and/or a measure of supply and demand for service providers in a given geographic region of the customer's current location. In this regard, the expected service value 15 may be based on expectations of distance that will likely be traveled, likely time of travel, likely route of travel, and/or other factors (e.g., supply and demand).

In determining the expected service value 15, the value determination logic 40 may access historical data stores, mapping and traffic services and other resources (collectively shown as "service value resources 30"). The service value resources 30 may include, for example, a historical database of parametric values (e.g., time/distance of travel, service values, supply/demand for service providers, etc.) determined from previously completed service requests.

In some examples, the expected service value 15 represents an upfront calculation (e.g., for price) for fulfillment of a service request, when one or more parameters which could otherwise influence the service value are uncertain or subject to change. As an upfront calculation, the expected service value 15 is determined in advance of service being provided to the customer based on the service parameters 11. Still further, the expected service value 15 can be determined in advance of the customer committing to requesting or receiving service. For example, the customer may generate the inquiry 12 to determine an upfront price that is to be charged to the customer account for receiving transport to a given destination. The actual calculations of the service value, if performed after the service request is fulfilled, may be based on distance and time of travel, as measured by monitoring the vehicle. In some implementations, the service value 15 can be communicated as a commitment, setting, for example, the service value 15 for a duration of time during which the system 100 will honor the service Alternatively, the system 100 may generate and display the service value 15 based on service parameters that are inferred. The inference may include using a customer profile, and interpreting actions, such as the launch of a service application from which the user may access and use a service of the system 100. For example, the service parameters 11 may include the current location of the customer, which the user device 10 can automatically determine through execution of the service application using, for example, a GPS or other geo-aware resource all and then communicate the current location of the customer to the system 100, along with a user or device identifier. In such examples, the service value 15 may be based at-least in part on the current location of the customer, the customer profile (e.g., the customer's home address, work address, favorite destination, etc.), and/or information known about the population of users (e.g., "hotspots" in the geographic region).

The service value 15 can facilitate the customer in deciding if or when to send a service request 16. For example, if the customer deems the service value 15 to be too high at a given moment, he can elect to forego requesting the service altogether. This in turn saves the system 100 from dedicating a service provider to a service request that is likely to be canceled because, for example, the customer thinks the service value 15 is too high. Conversely, in an example of FIG. 1, a customer can view the service value 15 on the user device 10, and then elect to send the service request 16 to receive the service at the displayed service value 15. Additionally, the customer can view the service value 15 and elect to wait, or move to a different nearby location, in order to affect the service value in a manner that is favorable.

Once the service request 16 is received, the system 100 can signal a service start 18 to a given service provider via the service provider's device. The service provider can initiate the service for the requesting customer. For example, the service provider initiates service to fulfill a service request by operating a vehicle to a service location (e.g., pickup location) or other service location. Once service starts, the system 100 can receive monitoring information 21 in order to monitor the service provided by the service provider. Depending on implementation, the monitoring information 21 can be provided by the service provider device 20, the user device 10, a combination of both devices, or another source (e.g., onboard vehicle computer). By way of example, the monitoring information 21 can include position information, timing information (e.g., timestamps provided with GPS coordinates), sensor data (e.g., such as provided by accelerometers on mobile devices of the service provider or customer, indicating when the vehicle has come to a stop), and/or manual input from the service provider or customer, indicating, for example, an event or milestone of the service provided to the customer (e.g., customer dropped off at destination).

In some examples, the monitoring information 21 includes position data provided by a location aware resource (e.g., GPS component) of the service provider device 20 and/or user device 10. The service monitoring process 22 can trigger, for example, one or both of the mobile devices into repeatedly (or continuously) sending position information when the service provider initiates a service for a service request of the customer. The monitoring information 21 may also include input provided from the service provider device 20. For example, the service provider may provide manual input to indicate when the service for a given service request is fulfilled. The location associated with a timestamp (e.g., such as may be provided by GPS) that coincides with when the service provider provided the service fulfillment input may deemed as the actual destination.

As an addition or alternative, the user device 10 of the customer can be used to obtain the monitoring information 21. For example, the system 100 may interface with the customer to obtain the position of the vehicle when service has been initiated. By comparing position information as determined from the user device 10 to that of the service provider device 20, the system 100 can, for example, reliably determine the destination of the service request, or alternatively, verify the destination as determined from another source of information. Still further, the comparison of position information as determined from the user device 10 and the service provider device 20 can serve as an alert for determining the actual destination.

When the customer is dropped off at the destination, the service monitoring 22 may cease. The service monitoring 22 may determine actual (as determined after the fact) service parameters 17, including an actual destination, an expended travel distance, and/or an expended time of travel. The value determination logic 40 may then determine the actual service value 25, based on the actual service parameters 17. In some variations, the actual service parameters 17 may identify a route taken, a distance traveled for the service request, a toll event, and/or a number of stops taken by the vehicle when fulfilling the service request. In other variations, the service monitoring 22 may determine the actual service parameters 17 to include identification of likely detours or rest points. The detected detours and rest points may coincide with places where the provider's vehicle is detected as stopping outside of the normal flow of traffic.

According to some examples, a monitoring component 50 operates to determine whether a cost or value of the service provided exceeds corresponding expected values by more than corresponding thresholds. If the monitoring component 50 determines that the cost or value of the service provided is within acceptable predetermined thresholds of corresponding expected values, then the expected service value 15 is used as a service allocation value 35. The account allocation component 60 may use the service allocation value 35 to collect and distribute funds or other electronic account resources as between accounts associated with the customer, the system 100, and/or the service provider.

As described in greater detail, however, if a determination is made that the cost or value of the fulfilled service request 16 deviates from what is expected (e.g., based on the expected service value parameters 11), then an attribution determination may be made to attribute at least a portion of the deviation to one of the service provider or the customer. By way of example, the monitoring component 50 can determine whether one or more of the actual service parameters 17 exceed corresponding expected service value parameters 11 by more than a corresponding threshold amount. For example, the monitoring component 50 may determine a distance differential by comparing the traveled distance and the expected distance of travel. Depending on implementation, the monitoring component 50 may perform the comparison as between (i) the actual destination and the expected destination of the service request 16, or (ii) the actual route taken by the service provider and the expected route.

As an addition or variation, the monitoring component 50 determines a duration differential based on a comparison of (i) an expended (or measured) travel time, as determined after service completion, and (ii) an expected travel time, determined before the service request 16 is received.

As an addition or variation, the monitoring component 50 may implement the value determination logic 40 to determine an actual service value 25 (e.g., determined after-the-fact) for the fulfilled service request 16 based on the actual service parameters 17. In some examples, the use of the actual service value 25 is triggered when the distance or duration differentials exceed corresponding thresholds. In variations, the use of the actual service value 25 is based on a determination that the actual service value 25 exceeds the expected service value 15 by a corresponding value threshold.

Comparisons can be made of the estimated and actual service parameters 11, 17, and/or the estimated and actual service values 15, 25, in order to determine whether a deviation of significance (e.g., when distance and/or duration differentials exceed thresholds) occurred with fulfillment of the service. In some examples, the system 100 implements an attribution process 60 to determine whether the cause of the deviation is attributable to either the customer's actions or the provider's actions. If the cause of the deviation is attributable to either the customer or provider, an account allocation process 70 may adjust a default account allocation value 35 (e.g., the monetary amount charged to the customer for receiving transport from the service provider) between accounts associated with the customer, the service provider and/or the system 100. In some examples, the default account allocation value 35 (e.g., price or monetary amount to provide customer transport in an automobile) may be based on the estimated service value 15, unless a deviation between the actual and expended service parameters is attributable to the customer and/or the service provider.

The attribution process 60 may implement rules in order to attribute a deviation in the fulfillment of the service request to one of the customer or driver (or other cause). In one implementation, the attribution process 60 determines from the monitoring information 21 whether the customer changed the destination after service was initiated. The determination may also be based on inferences, such as, for example, an inference that the customer would not agree to extending a trip beyond a reasonable walking distance from a desired destination. Accordingly, in some examples, an inference rule may apply to attribute a deviation in the destination to the customer when the distance between the actual and expected destinations exceeds a threshold measure (e.g., based on reasonable walking distance).

Likewise, the attribution process 60 may attribute a deviation to the service provider based on, for example, a determination of a route taken by the service provider. The attribution process 60 may also compare the locations of the customer and service provider in a timeframe that precedes the moment when the service provider signals the destination as having been reached. The attribution process 60 may perform the comparison to detect when an actual destination (as determined from position data from the user device 10) precedes the expected destination, followed by the service provider indicating (by service provider input) that the actual destination is closer to the expected destination.

The attribution process 60 may also attribute some deviations as being incidental, such as when traffic congestion is present or causes a detour. The attribution process 60 may determine incidental deviations when, for example, a trip duration exceeds a duration threshold, but the distance differential does not exceed the duration differential. In such cases, the attribution process 60 may determine, from, for example, monitoring information 21, whether the vehicle was engaged in continuous long stops (e.g., using accelerometer data and/or GPS position information) indicative of traffic congestion. In variations, the attribution process 60 may also use the monitoring information 21 to determine when the customer is likely to have made the service provider wait, before, for example, entering the vehicle. In some examples, the monitoring information 21 may use, for example, location data of the service provider device 20, location data of the user device 10, sensor information from the service provider device 20, or other input to determine that the customer made the service provider wait before entering the vehicle. In this respect, the system 100 operates more efficiently by dis-incentivizing customers from misusing the service arrangement system 100 with actions that waste resources (e.g., wait time) and unfairly cost the service provider.

In some examples, if the attribution process 60 determines the cause of the exceeded service value to be attributable to the customer, then system 100 may determine the account allocation value 35 to be greater than the service value 15. For example, the account allocation value 35 may be increased, with the increase being charged or allocated (negatively) to the customer. In such case, the customer may, for example, be charged a greater value than what would have been charged to the customer by default (e.g., price for transport is based on the expected service value). In one implementation, the customer is charged a value that is based on a calculation of time and distance traveled ("actual service value 25"), rather than the expected service value 15 which did not account for the customer misuse. In variations, an average or weighting scheme may be implemented to determine the account allocation value 35 charged to the customer.

When the attribution process 60 determines the cause of the exceeded service value to be attributable to the service provider, the system 100 may determine the account allocation value 35 to be the same as the expected service value 15. However, the portion of the account allocation value 35 which is attributable to the service provider may be reduced to account for the inefficiency of the service provider. In some examples, the account allocation value 35 of the customer may also be reduced to account for the customer's inconvenience. The account allocation process 70 may then collect and distributes account resources (e.g., electronic funds) based on the account allocation value 35.

Figure 2:
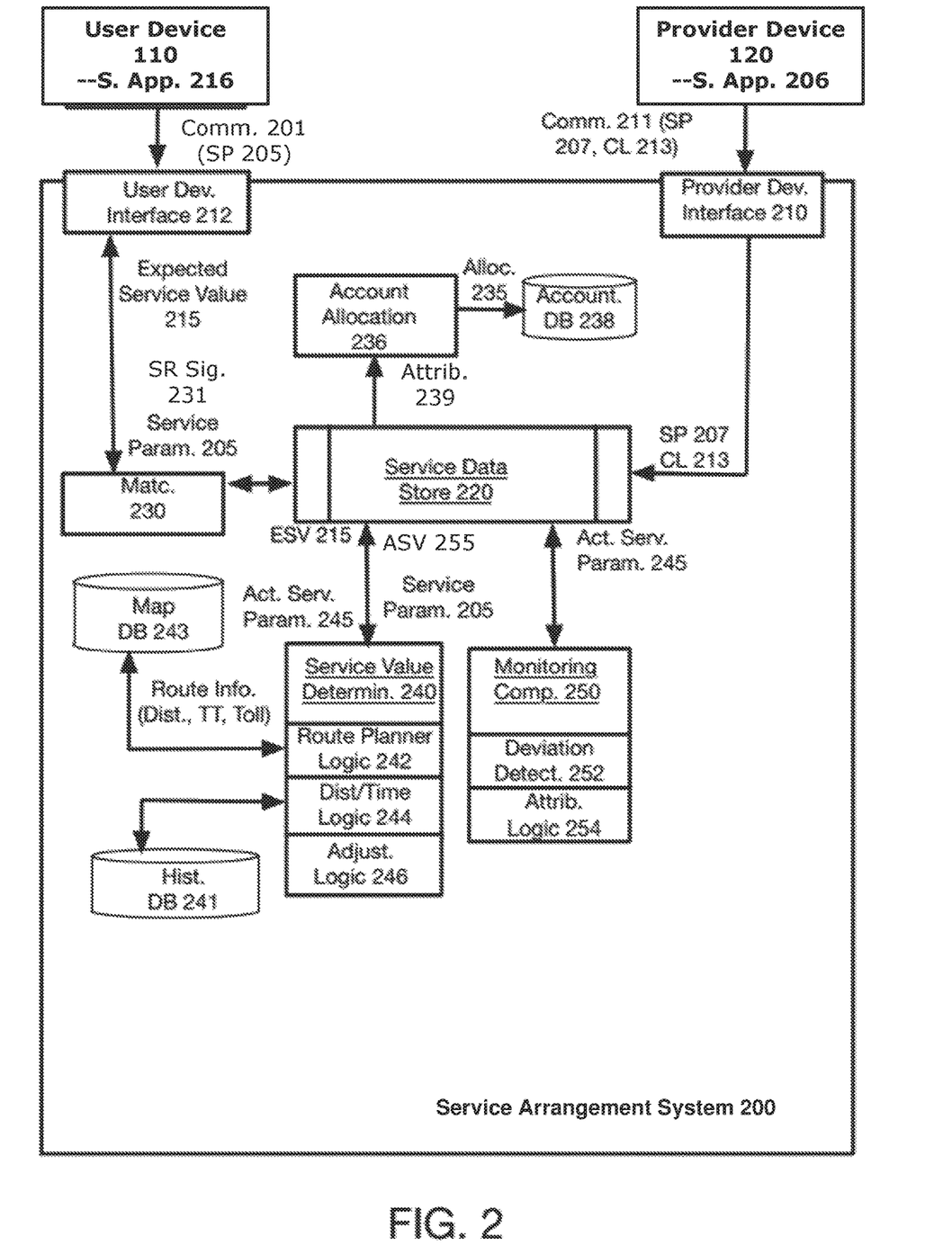
FIG. 2 illustrates a network computer system to arrange for service providers to fulfill service requests, according to one or more examples.

FIG. 2 illustrates a network computer system to arrange for service providers to fulfill service requests, according to one or more examples. As described, a network computer system may implement a service arrangement system 200, such as described with an example of FIG. 1. The service arrangement system 200 may be implemented by one or more servers, communicating with mobile devices of the user base, where the user base includes both customers and service providers. The service arrangement system 200 may also implement a network platform that utilizes mobile devices of a population of users, on which service applications are operated to enable users to access and utilize the service arrangement system 100 over network(s) such as the Internet.

With reference to FIG. 2, the service arrangement system 200 may fulfill service requests, such as people transport, freight shipping, package delivery, food and perishable delivery, and other similar services. The service provider device 120 may be representative of mobile devices used by service providers in a given geographic region to access the service arrangement system 200. Likewise, the user device 110 may represent customers in the given geographic region who request services that are fulfilled by the service providers.

According to some examples, the service provider operates the provider device 120 to signal when the service provider begins a shift. The service provider may launch the service application 206 on the provider device 120, and the service application 206 may execute processes to establish communications with the system 200. The service application 206 may signal a service provider identifier 207 to the system 100. Additionally, the service application 206 may continuously or repeatedly signal location information from a geo-aware resource, such as a GPS component that is resident on the provider device 120. Other information which may be communicated from the provider device 120 may include sensor information, such as provided by an accelerometer and/or gyroscope, which may also be present on the provider device 120. When the service provider initiates a shift, a provider device interface 210 receives a communication 211 from the provider device 20. The communication 211 may be parsed for the current location 213 of the provider device 20. The provider device interface 210 may store the current location 213, along with the identifier 207 of the service provider in a service data store 220. The service data store 220 may maintain service provider records, identifying each active service provider, the current location of the service provider, and a service state of the service provider. By way of example, the service state may reflect (i) one or more available states, such as when a driver has not been assigned to a service request, and/or when an assigned service provider is available for another assignment that follows completion of a current assignment; and (ii) one or more unavailable states, such as when a driver is assigned and on route to the start location, and/or when the service provider has started performing a service to fulfill a service request.

The user device 110 may include functionality provided by a service application 216 that is specialized for facilitating customer type operations. The customer may launch the service application 216 in order to generator a service communication 201 that is received by the user device interface 212. The service application 216 may execute on the user device 10 to associate an identifier with the communication 201. The service communication 201 may correspond to an inquiry event or a service request. Additionally, the communication 201 may be associated with a set of service parameters 205. By way of example, the service parameters 205 may include one or more service locations (e.g., a service start location, a destination), as well as a service type of preference. In some examples, the set of service parameters 205 are provided by user input, such as by the user interacting with a map interface on the user device 110. In variations, some or all of the set of service parameters 205 are determined automatically, using logic executed as part of the service application 216 and/or the service arrangement system 200. For example, the user device 110 may identify the customer's current location, favorite destination, or home or work address as a start or destination for a potential (or likely) service request. As an addition or alternative, the user device interface 212 may associate the customer identifier with a profile, which may identify likely destinations or other service parameters for that user.

In some examples, the service application 216 executes to provide the customer with a sequence of information, in advance of the customer making a request for service. The sequence of information may identify, for example, available service types (e.g., class of vehicle), estimated time until service would initiate, and an expected service value. In order to determine the expected service value, the service application 216 generates the communication 201 for inquiry information, in response to application triggers, such as user-input to view available services, or an application launch. As an inquiry, the communication 201 may correspond to a pre-request, or an action of the customer on the device 110 which indicates the customer may want to request service soon. The user device interface 212 may receive the communication 201 and identify the communication as an inquiry.

A matching component 230 can operate to match service requests to service providers, using the service parameters 205 of the respective request, and information recorded about active service providers (e.g., service provider identifier 207 and current location 213) in the service data store. When service requests are received from the user devices, the matching component 230 can generate a service request record that reflects the service request, as well as the matched state (e.g., whether service provider has been selected for the service request, whether service has been initiated or completed, etc.). The service request records may also be updated with position and time-stamps to reflect actual service parameters 245, reflecting distance traveled and/or time expended on a given trip in completion of a service request.

In one implementation, the user device interface 212 may trigger the creation of a virtual record in the service data store 220 for the inquiry of the user device 110. The virtual record for the inquiry may be specific to the service parameters 205 of the communication 201. The service value determination component 240 can use the service parameters 205 of the virtual record to determine an expected service value 215 (e.g., service fee). In calculating the service value, the service determination component 240 may use resources, such as historical information 241, including average service values, time of travel, travel distances, routes, and other information from a relevant historical time period (e.g., past month). The historical information 241 may be searched for similar service parameters (e.g., same or close start and destinations) in order to determine an expected set of service parameters, as well as the expected service value 215. The service determination component 240 may also use a mapping database to select a best route for the service parameters 205, or alternatively, to select a most likely route for the service parameters 205. The service determination component 240 may also determine a likelihood that an expected route will include a toll. In one implementation, the service determination component 240 calculates the expected service value 215 based on a most likely set of service parameters (e.g., start location, destination, route), as determined from the historical information 241 and mapping database 243. In another implementation, the service determination component 240 calculates the expected service value 215 based on historical service values for similar service parameters. Still further, the service determination component 240 may calculate the expected service value 215 based on an average or weighting that accounts for probabilities for certain service parameters (e.g., route taken, distance travelled, duration, etc.). The service determination component 240 may associate the expected service value 215 with the record in the service data store 220 which represents the inquiry from the user device 110. In some examples, the matching component 230 can retrieve and display the expected service value 215 to the user device 110 via the user device interface 212.

The expected service value 215 may represent an upfront commitment from the system 100 to the customer as to the service charge for a service request having the same service parameters 205. In some variations, the service determination component 240 (or other logic of the system 200) may associate an expiration time with the virtual record that represents the inquiry from the user device 110. The user device interface 212 may receive and communicate the expected service value 215 to the user device 110. The service application 216 may operate on the user device 110 to display the expected service value 215 in connection with the set of service parameters 205. In some variations, the service application may also indicate or display a duration of time before when the expected service value 215 is expired. In this way, the expected service value 215 may be displayed as an upfront service price or value, which the system 200 may commit to should the customer make a subsequent request for transport in the permitted time interval.

The service application 216 can operate on the user device 110 to signal the communication 201 as a service request. For example, the user may select a request feature once the inquiry information (including the expected service value 215) is displayed to the user. When the request feature is selected, the service application 216 may send the communication 201 to the system 200 with a corresponding set of service parameters 205. In some examples, the service application 216 (and/or other logic implemented on the system 200) includes logic to control when the service request is associated with a previous service inquiry, so that the expected service value 215 does not become an open commitment from the system 200. In one implementation, the service application 216 utilizes a timer to determine when the expiration of the expected service value 215 occurs. As an addition or variation, the service application 216 may implement a position monitor to see if the user changes their position in a manner that may be significant to the determination of the service value. Still further, the service application 216 may detect if the user changes the service parameters 205 from those used to provide the expected service value 215.

When the expiry of the expected service value 215 occurs, or when variances in the service parameters 205 are detected with a service request that is made in conjunction with the communication of the expected service value 215, the service application 216 may initiate a sequence of operations to obtain another expected service value. In one implementation, the service application 216 may send another inquiry communication 201 to the system 200 to determine if the expected service value has changed. In response, the service value determination component 240 can generate another estimated service value 215 for a new or updated virtual record.

According to some examples, if the newly received determined service value 215 has changed by an amount that exceeds a predetermined threshold, the service application 216 can display a notification or implement another action in order to enable the user to alter or cancel the service request. In this way, the service application 216 may determine, for example, variances in the set of service parameters 205 of the service request, as compared to the service inquiry, and the service application 216 may implement rules as to when the variances are accepted or when such variances require a new expected service value. In some variations, the user device interface 212 may also determine if the communication 201 (now a service request) meets criterion of timeliness, or if the service parameters 205 are the same as those of the inquiry from the same device.

In some examples, when the communication 201 from the user device 110 corresponds to the service request, the user device interface 210 may update the virtual record created from the prior inquiry. The user device interface 210 can also communicate an incoming service request signal 231 to the matching component 230. The service request signal 231 may identify the record of the active data store 220, and/or otherwise specify parameters 205 for the service request. In one implementation, the matching component 230 uses the set of service parameters 205 to determine a service provider for the service request associated with the user device 110. The matching component 230 can select a service provider from the service data store 220 based on parameters such as the current location of an available set of service providers. The matching component 230 can then assign the selected service provider to the service request. Once a service provider is matched to a service request, the provider device interface 210 can be triggered to communicate the service parameters 205 to the device 120 of the selected service provider.

While the service provider provides the service (e.g., arrives at the service start location and progresses to the destination), the service application 206 can operate on the provider device 120 to maintain communication with the system 100 (e.g., by repeatedly communicating the location of the service provider). The current location of the service provider is updated in the service data store 220 by the provider device interface 210. The provider device interface 210 may also store other information in the service data store 220, including sensor information (e.g., from accelerometer of the service provider device 110) and inputs from the service provider regarding start position, service completion, detours, wait time, or contextual information such as traffic. In some examples, the user device interface 212 may also record location and/or sensor information of the user device 110 with the record of the customer's service request.

The monitoring component 250 may monitor the records of the service data store 220 to determine service events of open and pending service requests. In some examples, the monitoring component 250 detects when a service request has been fulfilled. For example, the monitoring component 250 can detect when a service request has been fulfilled based on (i) input provided from the service provider (e.g., service provider interacts with the service application 206 to indicate completion of service request), or (ii) location information provided from the provider device 120 and/or user device 110. When the service request is completed, the monitoring component 250 flags the record of the service request, or otherwise initiates a system trigger to process the completed service request.

When the monitoring component 250 marks the record of the service request complete, the monitoring component calculates an expended set of service parameters 245. In determining the actual service parameters, the monitoring component 250 may use information about the service provided to determine the expended set of service parameters 245. The expended set of service parameters 245 may include the route taken, the duration of the trip, the distance travelled and other information. The service determination component 240 may then determine the actual service value 255 based on expended service parameters 245. The service determination component 240 may associate the expended set of service parameters 245 and the actual service value 255 with the service record.

The monitoring component 250 can also analyze the parametric data stored with the record of the fulfilled service request to determine if a deviation exists as between the expected service value 215 (and/or the service parameters 205 used to determine the expected service value) and the actual service value 255 (and/or the expended service parameters 255 of the fulfilled request). The monitoring component 250 may implement deviation detection logic 252 to identify the particular deviations, including differentials as to the actual and expected distance traveled and as to the actual and expended duration of time. In some variations, the deviation detection logic 252 can also identify when the route taken was unexpected. Additionally, the deviation detection logic 252 can identify situations where the route taken was unexpected and resulted in a toll being present, as well as the converse scenario where the route taken was unexpected and resulted in an expected toll not being present.

In some examples, the monitoring component 250 can also operate to detect certain deviations from the set of service parameters 205 while the service is being provided. For example, the monitoring component 250 can monitor position information and/or input from the customer and/or provider to determine when the customer has initiated a detour or additional service stop. When the deviation is detected, the monitoring component 250 can signal a notification via the user device interface 212 to confirm the deviation and the nature of the deviation (e.g., initiated by the customer), as well as to inform the customer of a consequence of the deviation.

In some examples, the monitoring component 250 includes attribution logic 254 that determines when an identified deviation exists that is sufficiently significant to merit an attribution determination. In some examples, the attribution determination may be made anytime the actual service value 255 exceeds the expected service value 215 by a given threshold. The attribution logic 254 may be implemented to determine if the service provider or customer is a cause of the deviation. The attribution logic 254 may record attribution flags 259 or other parameters in connection with the record of the fulfilled service request in order to mark the determination of the attribution as one of customer, service provider, or other. Examples of rules which the attribution logic 254 may implement to determine attribution of deviations in the fulfillment of service requests are described in more detail with FIG. 4.

The account allocation component 236 distributes funds or other account resources (e.g., service credits) amongst the accounts of the service provider, customer, and/or service (shown with account database 238). By default, the account allocation component 236 may determine an account allocation value 235 that is based on the expected service value 215. In one implementation, the account allocation component 236 can move funds, service credits or other value from the account of the customer to a retention account that is managed or otherwise associated with the system 200. In one implementation, the account allocation component 236 also allocate funds from the retention account to the account of the service provider. In some examples, the default account allocation provides that funds allocated to the service provider account are less than the funds withdrawn (or otherwise charged to) the account of the customer, with the difference between the withdrawn and allocated amounts being a service fee.

In some examples, when the attribution logic 254 makes the determination that the customer is the cause of the deviation in the completed service request, the account allocation component 236 may change the account allocation value 235 so that the customer is charged more for the service provided. For example, the account allocation value 235 can be based on the actual service value 255, which may be calculated from time expended and distance traveled. In some examples, when the attribution logic 254 makes the determination that the service provider is the cause of the deviation, the account allocation component 236 may change the proportion of the account allocation value 235 which the service provider was to receive, with the amount withdrawn from the account of the customer being unchanged. Additionally, some examples provide that when the attribute determination does not attribute cause to either the service provider or the customer (e.g., when there is unexpected traffic), the account allocation value 235 may be unchanged. With respect to examples described, the monitoring component 250 can implement the attribution logic 254 to determine an attribution parameter 239, which identifies manner in which a detected deviation is to be allocated when the account allocation value 235 is determined.

Figure 3:
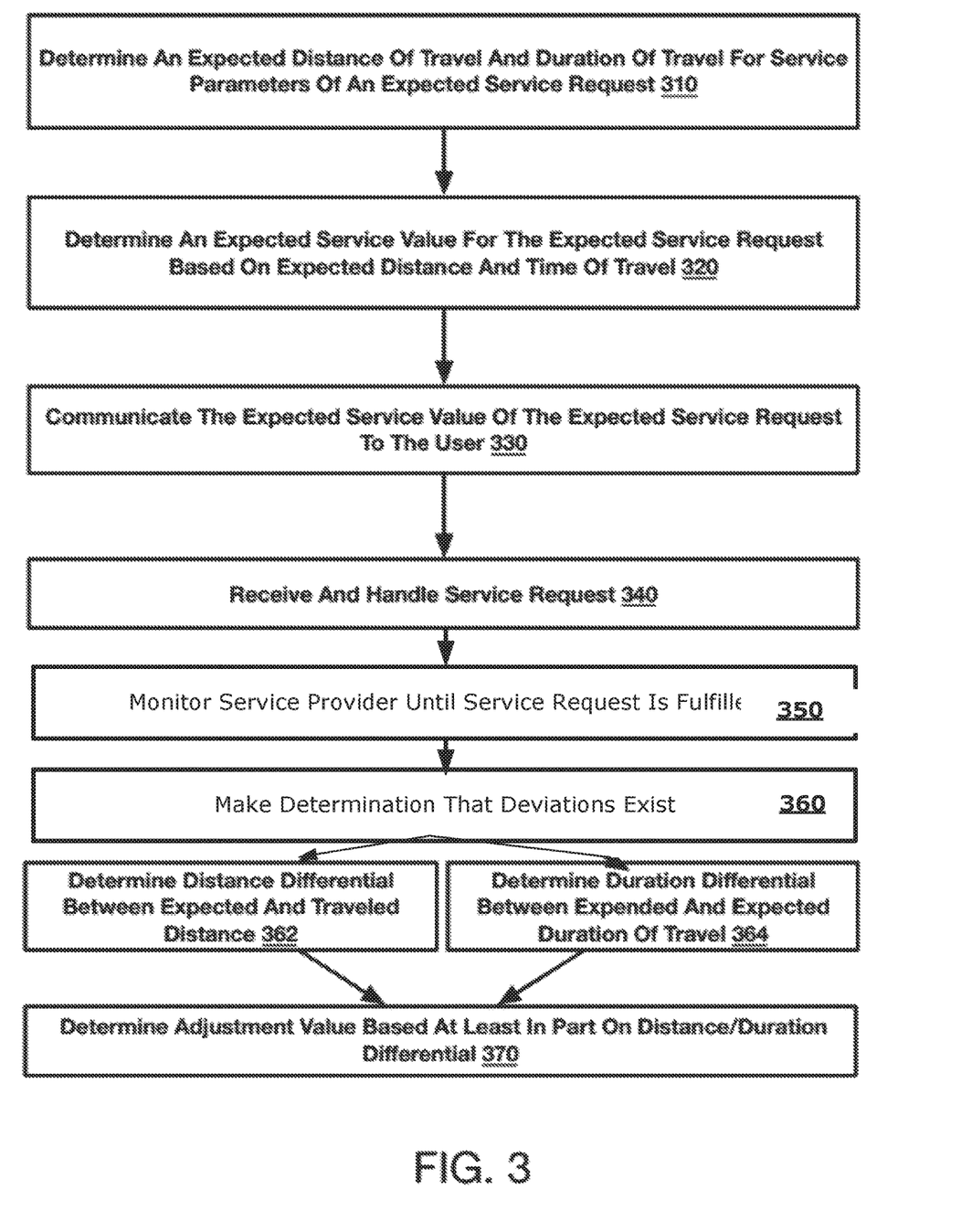
FIG. 3 illustrates a method for determining a service value for a service request, according to one or more examples.
Figure 4:
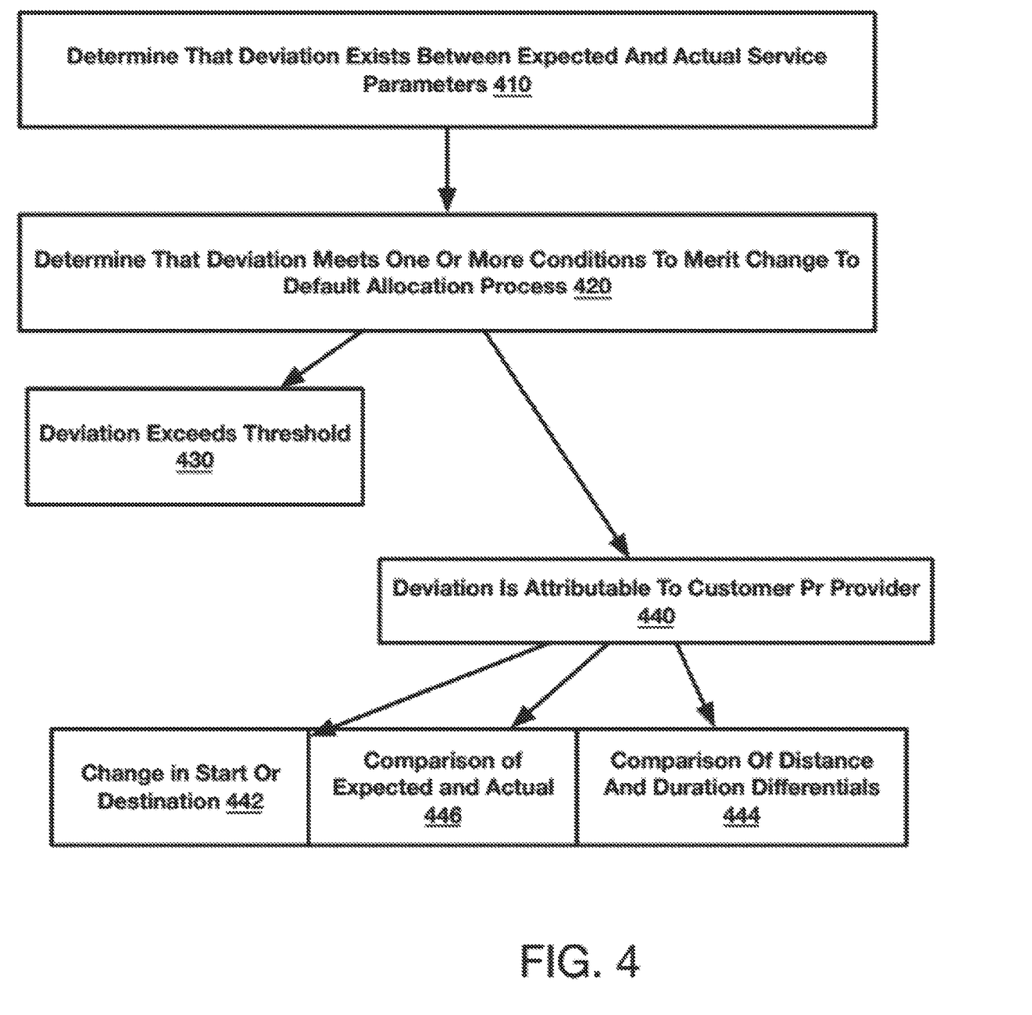
FIG. 4 illustrates a method for determining attribution for a deviation in service provided by a service provider, according to one or more examples.

FIG. 3 illustrates a method for determining a service value for a service request, according to one or more examples. FIG. 4 illustrates a method for determining attribution for a deviation in service provided by a service provider, according to one or more examples. A method such as described with examples of FIG. 3 or FIG. 4 may be implemented using a service arrangement system, such as described with an example of FIG. 1 or FIG. 2. Accordingly, in describing examples of FIG. 3 and FIG. 4, reference may be made to elements of FIG. 1 or FIG. 2 for purpose of illustrating a suitable component for performing a step or sub-step being described.

With reference to an example of FIG. 3, system 100, 200 determines an expected set of service parameters for an expected service request of a user. The expected set of service parameters may include an expected distance of travel and duration of time (310). As described with an example of FIG. 2, the expected service request may, for example, correspond to a communication in which an inquiry is communicated from a user device as a response The system 100, 200 determines an expected service value for the expected service request based on the expected set of service parameters, including the expected distance and time of travel (320). The expected service value may be communicated to the customer (330). For example, the expected service value may be provided on a panel or other user-interface element, from which the customer can provide input to request service.

The system 100, 200 may receive and handle the service request (340). In some examples, the service request is matched to a service provider based on parametric information, such as the service start location and/or the current location of the service provider. The service provider may initiate service for the customer when, for example, the customer enters the vehicle operated by the service provider.

Once service is initiated, the system 100, 200 monitors the service being provided to fulfill the service request (350). In some examples, the system 100 monitors the provider's device until the service request is fulfilled for position information, sensor information, inputs from the service provider, and/or other data. In some variations, the user device may also be monitored for position information, sensor information, and/or customer inputs.

Once the service request is fulfilled, the system 100, 200 makes one or multiple determinations in order to identify any deviations in the service provided (360). In one implementation, a comparison is performed of the distance traveled to fulfill the service request and the expected distance traveled (362). As an addition or alternative, a comparison is also performed on the expended and expected durations of time (364).

The system 100 makes a determination of an adjustment value based at least in part on the distance and duration differentials (370). The adjustment value may be applied to the expected service value to determine, for example, the account allocation value (e.g., value). In some examples, the adjustment value is zero when the distance and/or duration differentials are less than respective threshold values, such as when no deviation is detected for the fulfilled service request, or when the cause of the deviation is incidental. Similarly, the adjustment value may be non-zero and increased for the customer when the distance and duration differentials indicate a deviation that is attributable to the customer. In some examples, the adjustment value may also be zero when the deviation is attributable to the service provider.

With reference to an example of FIG. 4, when a service request is completed, the system 100, 200 can detect whether a deviation exists between the expected and actual service parameters (410). By way of example, the service parameters include parameters which are specified by the customer, such as a service start location and a destination, as well as determined service parameters, such as distance and duration of travel.

The system 100, 200 may determine when the deviation of a given service provider meets one or more conditions to merit change to a default allocation process (420). In one implementation, the default allocation process results in withdrawal of funds that correspond to the expected service value from the customer account (e.g., upfront price determination), and distribution of funds to the account of the service provider based on a proportion of the withdrawn funds. The conditions which merit change to the default allocation process may include (i) the deviation exceeds a threshold (430), (ii) the deviation is attributable to one of the customer or service provider (440), and/or (iii) other predetermined conditions.

The determination that the deviation exceeds a threshold may be based on a comparison of actual and expected service parameters (432). In some examples, the service value may be calculated based on the expected set of service parameters, then compared to the actual service value as calculated after the service is completed, using time and distance formulation. In variations, either or both of the expected and actual service value may also factor in supply and demand parameters, which can, for example, apply a multiple to time and distance calculations done for either of the expected or actual service value determinations.

The determination that a determined deviation is attributable to the customer or service provider may include determining whether the service request parameters (e.g., service start, destination) changed between the time when the expected service value was determined and when the service was rendered (442). By way of examples, (i) a change to the service start location may weight towards a determination of attribution to the customer; (ii) a change to the destination may weight towards a determination of attribution to the customer if the service provider was required to travel further to reach the destination (e.g., such as when customer requests the service provider to extend the service further after the service was terminated); (iii) a change to the destination where the actual destination is a hot-spot amongst other customers may be deemed the result of the customer making an incidental or unintended selection at the start.

Additionally, the determination that a determined deviation is attributable to the customer or service provider may include comparison of traveled distance and expended duration (444). By way of additional examples, (i) a change to the traveled distance (as compared to the expected distance) may weight towards a determination of attribution to the customer if the monitored information from the service provider indicates stops outside of traffic, such as on side streets or for extended durations (e.g., the customer adds a pickup en route to the destination); and (ii) a deviation as to the service duration may weight towards attribution to the customer if the expended time indicates wait time, particularly at the service start location.

Additionally, the determination that a determined deviation is attributable to the customer or service provider may include comparison of an expected route and an actual route (446). When the route selected is longer or slower, the attribution may be faulted to the service operator.

Additionally, the interaction of service provider may be processed for incorrect information. For example, the service provider may delay signaling the completion of the service request, in which case the determined deviation is attributable to the service provider.

Hardware Diagrams

Figure 5:
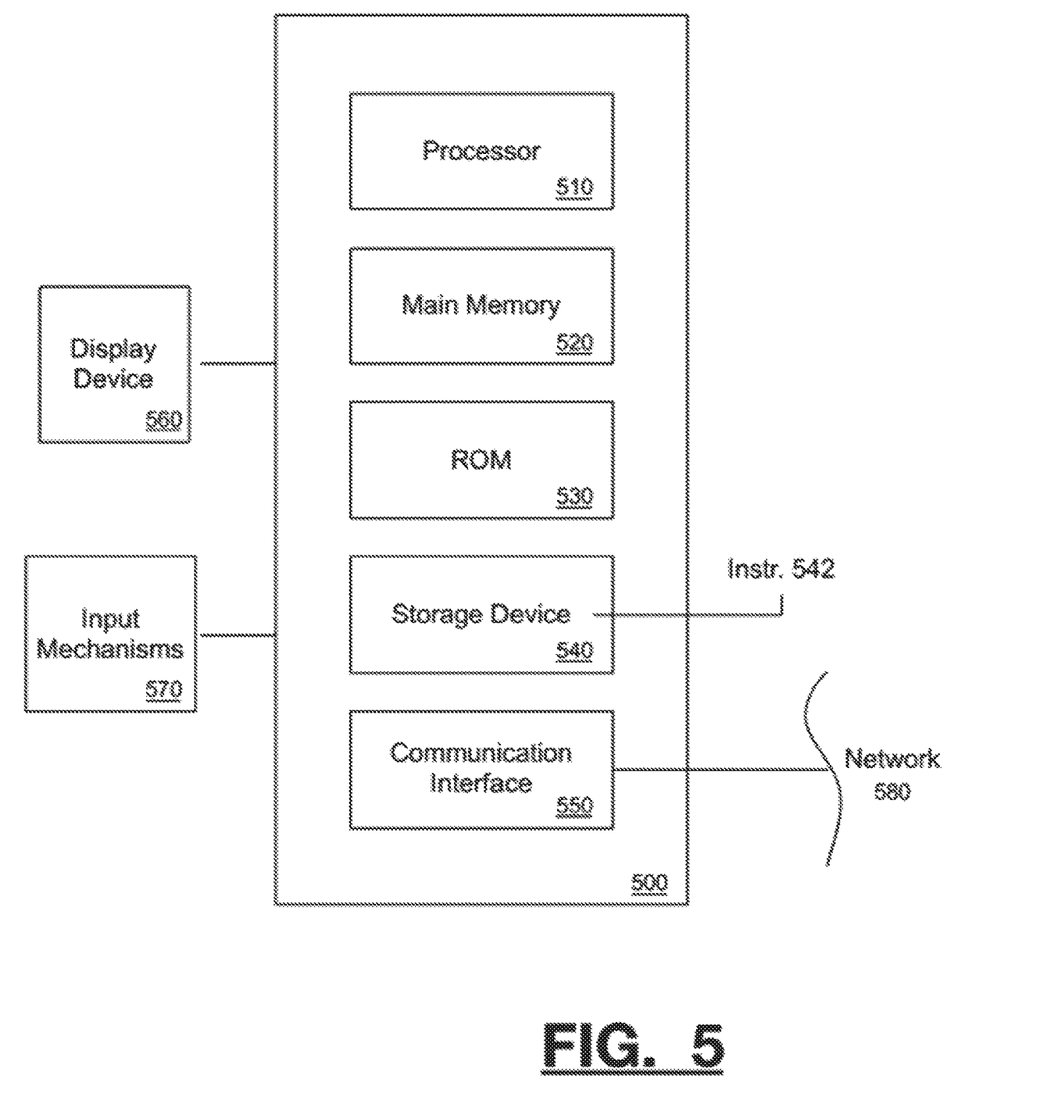
FIG. 5 is a block diagram that illustrates a computer system upon which embodiments described herein may be implemented.

FIG. 5 is a block diagram that illustrates a computer system upon which embodiments described herein may be implemented. For example, a computer system such as described by FIG. 4 may be used to implement a service arrangement system 100, such as described with examples provided above.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including instructions 542 for upfront service values and fallbacks.

For example, the processor 510 can execute the instructions 542 to implement system 100 (such as described with an example of FIG. 1), or system 200 (such as described with an example of FIG. 2). Likewise, the processor 510 can execute the instructions 542 to implement methods such as described with examples of FIG. 3 or FIG. 4.

The communication interface 550 can enable the computer system 500 to communicate with one or more networks 580 (e.g., cellular network) through use of the network link (wireless or wireline). Using the network link, the computer system 500 can communicate with one or more other computing devices and/or one or more other servers or data centers.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
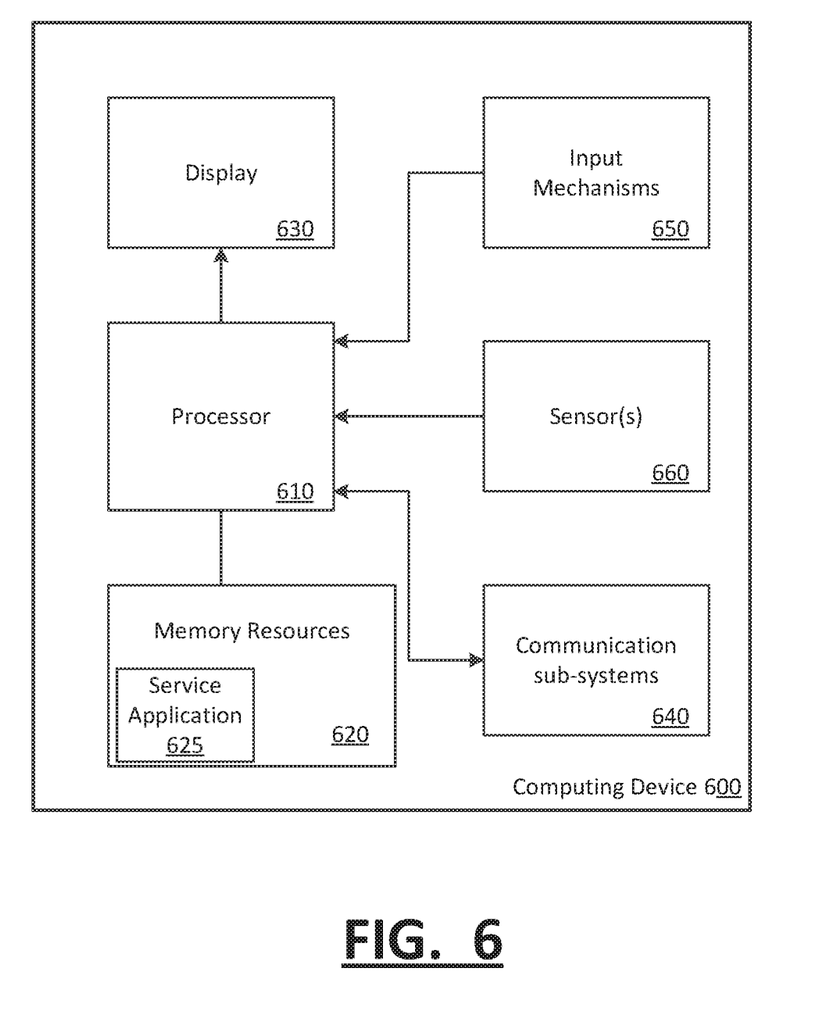
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a mobile computing device operated by a user or service provider. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more sensors 660. The one or more sensors 660 can include a location-determination satellite receiver (e.g., Global Positioning System (GPS) receiver), accelerometer, and/or cameras. In one example, at least one of the communication sub-systems 640 sends and receives cellular data over data channels and voice channels.

The processor 610 can provide a variety of content to the display 630 by executing instructions and/or applications that are stored in the memory resources 620. In some examples, the memory resources 620 store instructions for a service application 625, which can be executed by the processor 610. In this way, the processor 610 can be configured with software and/or other logic, including the service application 625. When the service application 625 is executed, the processor 610 can implement functionality of a user device 10 (see FIG. 1) or service provider device 20 (see FIG. 1). By way of example, the processor 610 can display an upfront price of an expected service request. For example, the processor 610 can communicate (via one or more of the communication sub-systems) prior to the user making the service request. The processor 610 may further generate communications (e.g., prompts) to obtain information for performing examples as described, and also to output changes to the service value when the determination is that the changes are attributable to the user.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
   a memory to store a set of instructions;
   one or more processors that use the set of instructions to:
   determine an expected distance of travel and an expected duration of travel for an expected service request of a user, the expected service request including a set of service parameters that include a service start location and a service completion location;
   prior to receiving a service request from the user, determine an upfront price for the expected service request based at least in part on the expected distance and the expected duration of travel;
   communicate the upfront price to the user;
   receive the service request corresponding to the expected service request, the service request specifying the set of service parameters;
   receive monitoring data, the monitoring data including provider location data from a location-aware resource of a computing device of a service provider fulfilling the service request;
   determine, from the monitoring data, a traveled distance and an expended duration for the service request;
   after completion of the service request, detect a deviation from the expected distance of travel or the expected duration of travel based on at least one of (i) a first comparison between the traveled distance to the expected distance of travel, or (ii) a second comparison between the expended duration and the expected duration of travel;
   determine that the deviation exceeds an acceptable predetermined threshold value;
   determine an adjustment value to the upfront price based at least in part on the deviation;
   apply a set of rules to the set of service parameters and the monitoring data to attribute a primary cause of the deviation to one of the service provider, the user, or an incidental cause; and
   determine an account allocation for the adjustment value between accounts associated with the service provider and the user based on the attribution of the primary cause of the deviation.

2. The computer system of claim 1, wherein the one or more processors monitor the service provider by obtaining location data from a location-aware resource of a computing device of the user.

3. The computer system of claim 2, wherein the one or more processors monitor the service provider by determining an actual service completion location, the actual service completion location being based on location data obtained from the computing device of the service provider and the computing device of the user.

4. The computer system of claim 1, wherein the one or more processors credit an account of the service provider by a default proportion of the upfront price when the adjustment value for the upfront price is zero.

5. The computer system of claim 4, wherein the one or more processors:
   determine when a threshold determination is exceeded based on at least one of (i) the distance differential exceeding a threshold distance; or (ii) the duration differential exceeding a duration threshold; and
   attribute a primary cause of the threshold determination to be at least one of the service provider, the user, or an other cause.

6. The computer system of claim 5, wherein the adjustment value is less than or equal to the determined service value if the primary cause of the threshold determination being exceeded is attributed to the service provider.

7. The computer system of claim 5, wherein the one or more processors credit an account of the service provider by a modified proportion of the upfront price that is less the default proportion that would otherwise be credited to the service provider if the adjustment value for the upfront price had been zero.

8. The computer system of claim 5, wherein the adjustment value is greater than zero if the primary cause of the threshold determination being exceeded is attributed to the user.

9. The computer system of claim 5, wherein the one or more processors attribute the primary cause by determining a route taken by the service provider, and stopping points on the route where a vehicle of the service provider stopped.

10. The computer system of claim 9, wherein the one or more processors attribute the primary cause by determining whether one or more stopping points were a traffic stop or a detour.

11. The computer system of claim 1, wherein the one or more processors monitor the service provider by:
    determining at least a portion of an expected route that the service provider will take, based on the set of service parameters; and
    comparing a portion of an actual route taken by the service provider in fulfilling the service request to a corresponding portion of the expected route.

12. The computer system of claim 11, wherein the one or more processors determine the adjustment value to account for a toll that is present in only one of the expected route or the actual route.

13. A non-transitory computer readable medium that stores instructions, which when executed by one or more processors of a computer system, cause the computer system to perform operations that include:

determining an expected distance of travel and an expected duration of travel for an expected service request of a user, the expected service request including a set of service parameters that include a service start location and a service completion location;

prior to receiving a service request from the user, determining an upfront price for the expected service request based at least in part on the expected distance and the expected duration of travel;

communicating the upfront price to the user;

receiving the service request corresponding to the expected service request, the service request specifying the set of service parameters;

receiving monitoring data, the monitoring data including provider location data from a location-aware resource of a computing device of a service provider fulfilling the service request;

determining, from the monitoring data, a traveled distance and an expended duration for the service request;

after completion of the service request, detecting a deviation from the expected distance of travel or the expected duration of travel based on at least one of (i) a first comparison between the traveled distance to the expected distance of travel, or (ii) a second comparison between the expended duration and the expected duration of travel;

determining that the deviation exceeds an acceptable predetermined threshold value;

determining an adjustment value to the upfront price based at least in part on the deviation;

applying a set of rules to the set of service parameters and the monitoring data to attribute a primary cause of the deviation to one of the service provider, the user, or an incidental cause; and     determining an account allocation for the adjustment value between accounts associated with the service provider and the user based on the attribution of the primary cause of the deviation.

14. A method for arranging transport, the method being performed by one or more processors and comprising:

determining an expected distance of travel and an expected duration of travel for an expected service request of a user, the expected service request including a set of service parameters that include a service start location and a service completion location;

prior to receiving a service request from the user, determining an upfront price for the expected service request based at least in part on the expected distance and the expected duration of travel;

communicating the upfront price to the user;

receiving the service request corresponding to the expected service request, the service request specifying the set of service parameters;

receiving monitoring data, the monitoring data including provider location data from a location-aware resource of a computing device of a service provider fulfilling the service request;

determining, from the monitoring data, a traveled distance and an expended duration for the service request;

after completion of the service request, detecting a deviation from the expected distance of travel or the expected duration of travel based on at least one of (i) a first comparison between the traveled distance to the expected distance of travel, or (ii) a second comparison between the expended duration and the expected duration of travel;

determining that the deviation exceeds an acceptable predetermined threshold value;

determining an adjustment value to the upfront price based at least in part on the deviation;

applying a set of rules to the set of service parameters and the monitoring data to attribute a primary cause of the deviation to one of the service provider, the user, or an incidental cause; and     determining an account allocation for the adjustment value between accounts associated with the service provider and the user based on the attribution of the primary cause of the deviation.

* * * * *